Aug. 15, 1967   F. COHEN   3,336,038
RIDING SUPPORT FOR SKIS AND THE LIKE
Filed Aug. 4, 1965   3 Sheets-Sheet 1
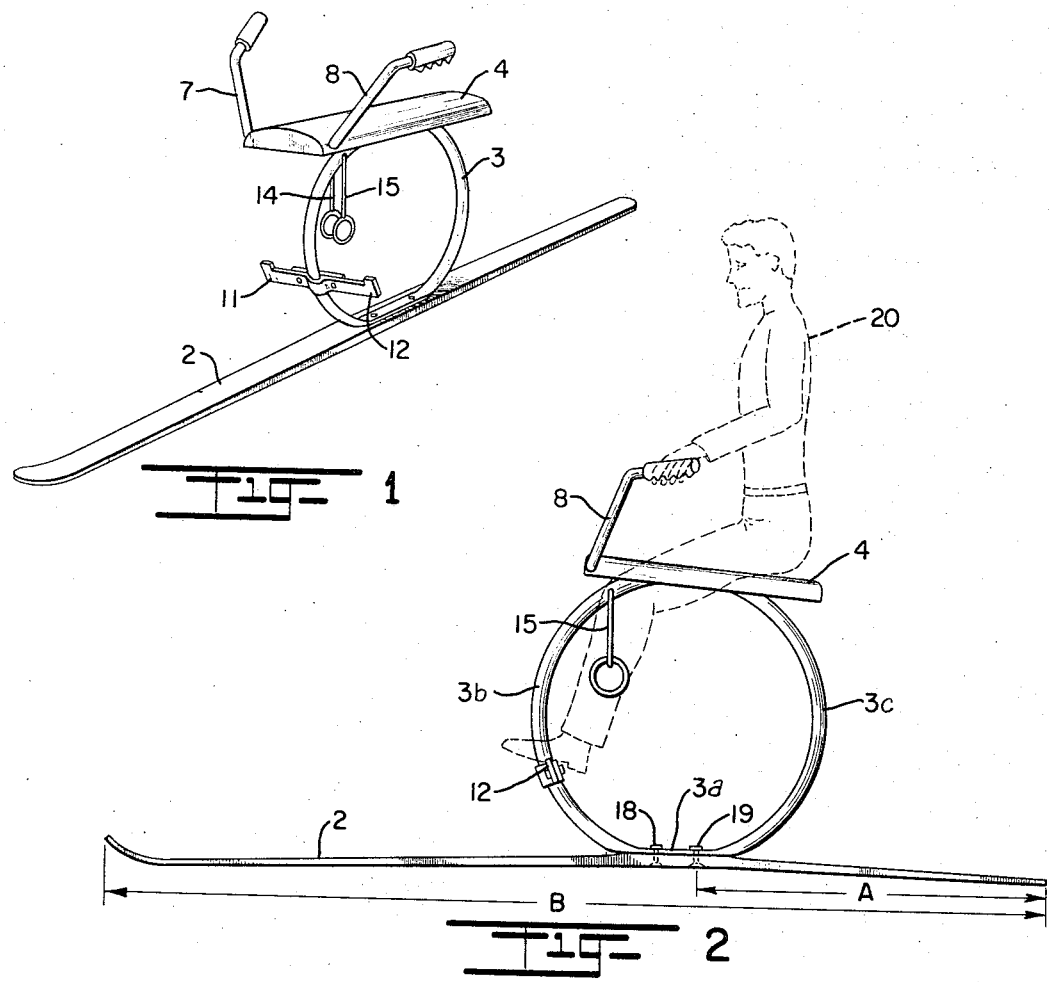
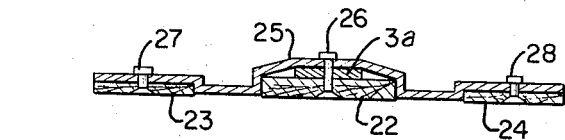
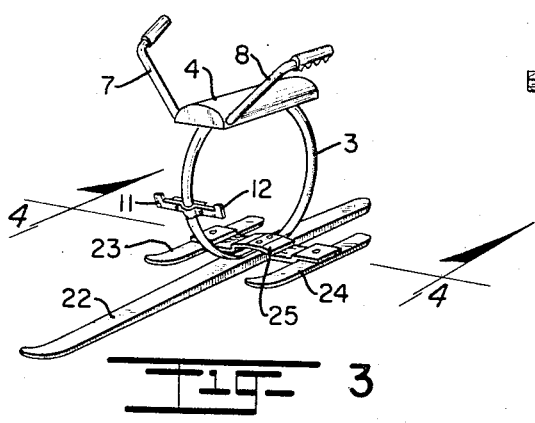
INVENTOR
FELIX COHEN
ATTORNEYS Aug. 15, 1967  F. COHEN  3,336,038
RIDING SUPPORT FOR SKIS AND THE LIKE
Filed Aug. 4, 1965  3 Sheets-Sheet 2
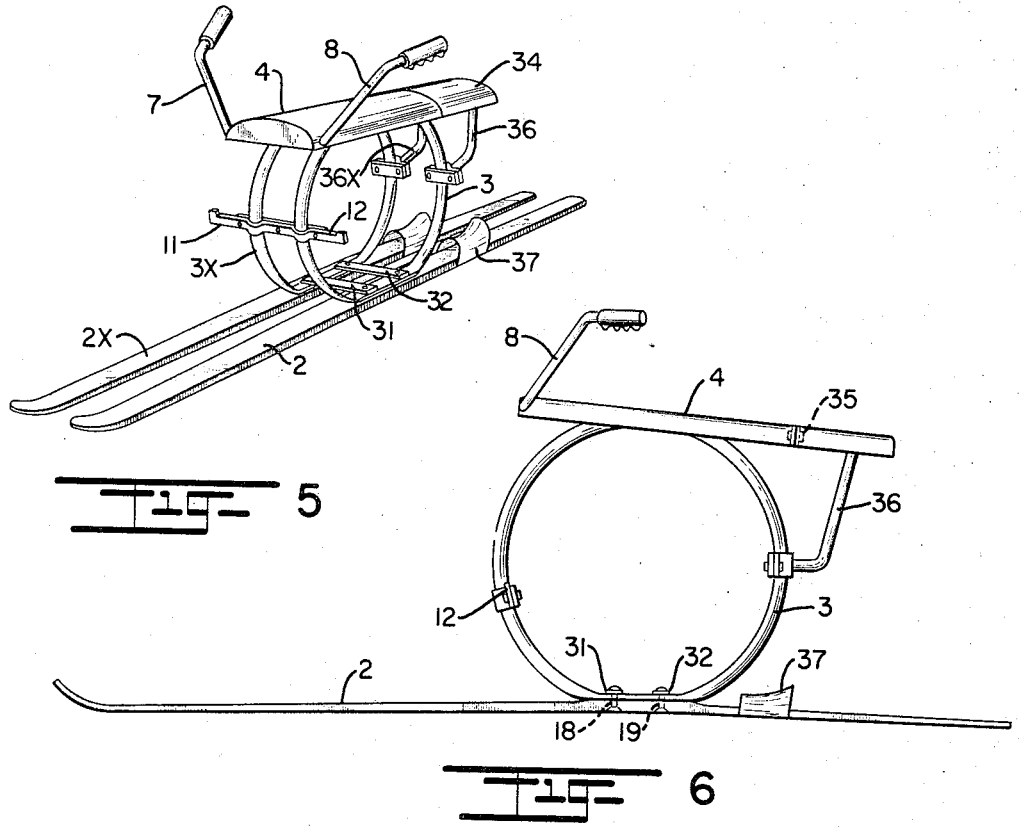
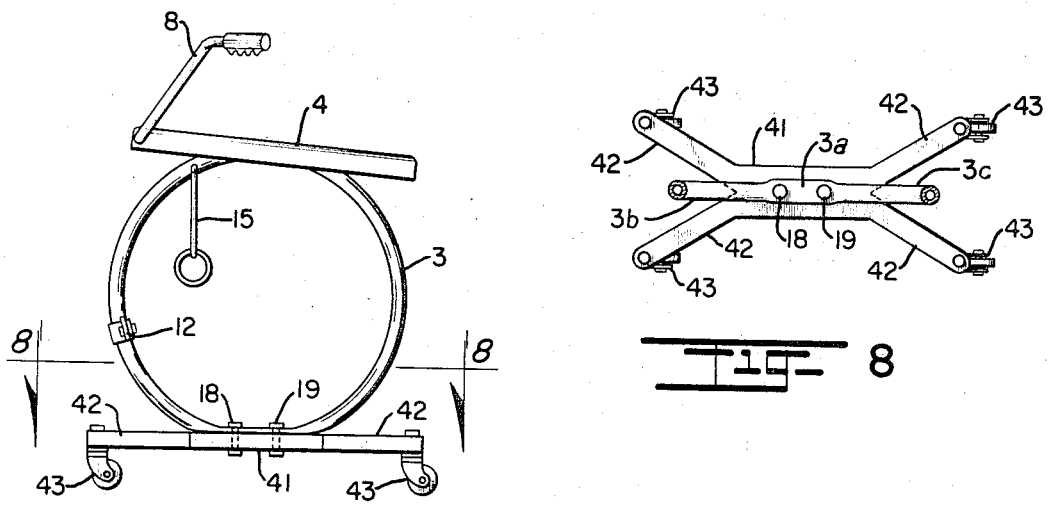
INVENTOR
FELIX COHEN
BY
ATTORNEYS Aug. 15, 1967   F. COHEN   3,336,038
RIDING SUPPORT FOR SKIS AND THE LIKE
Filed Aug. 4, 1965   3 Sheets-Sheet 3
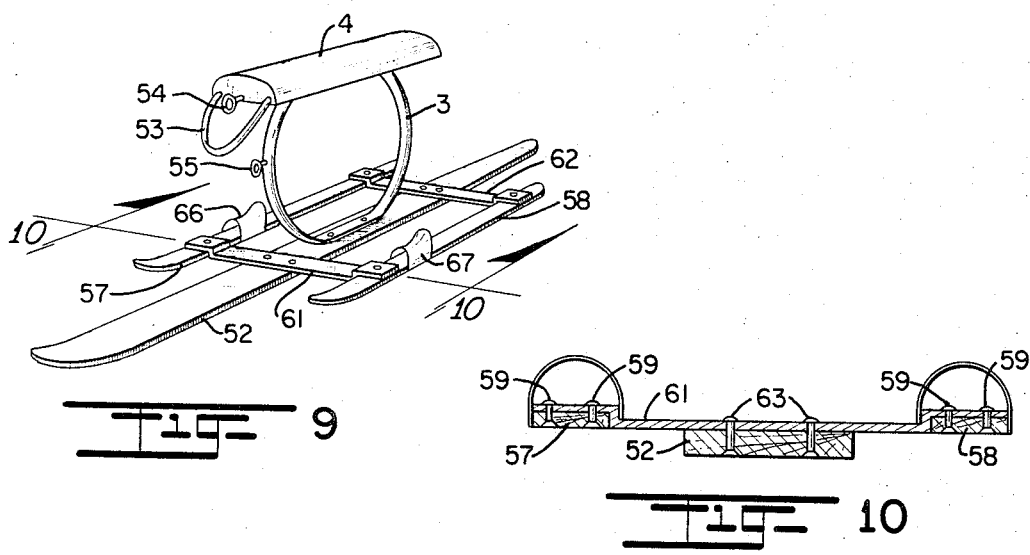
INVENTOR
FELIX COHEN
BY
ATTORNEYS United States Patent Office 3,336,038
Patented Aug. 15, 1967

3,336,038
RIDING SUPPORT FOR SKIS AND THE LIKE
Felix Cohen, 2465 S. Kearney St.,
Denver, Colo. 80222
Filed Aug. 4, 1965, Ser. No. 477,101
11 Claims. (Cl. 280—12)

ABSTRACT OF THE DISCLOSURE

A riding support for a surface contact transport member having an integral frame including a base fixedly secured on the transport member, upstanding front and rear portions forwardly and rearwardly of the seating surface of the base portion, a seat supported at the top of the frame, grip means mounted at the forward end of the seat and a foot rest attached to the forward upright portion of the frame for supporting a body of a rider in a balanced seating position.

This invention relates generally to riding supports and more particularly to a novel riding support unit for use in combination with various surface contact transport members, including snow skis, water skis, wheeled platforms and the like.

Various types of surface contact transport members are currently available and in general usage, such as snow skis, water skis, wheeled platforms and the like, on which the rider is carried at a standing position. In the standing position, substantial skill is required to maintain the balance and control different movements of the transport member. Many persons lacking the skill and experience for standing transport on such members possess a sufficient sense of balance to operate such members where supported thereon in a sitting position.

Accordingly, it is an object of this invention to provide a riding support unit on which the rider is firmly supported in a sitting position under optimum balance conditions.

It is another object of my invention to provide a simple, durable and easy to use riding support unit which is adapted for mounting of various types of transport members for interchangeable use.

It is a further object of my invention to provide a novel riding support unit which may be easily and selectively mounted on various types of available water skis, snow skis, and wheeled platforms.

Further objects and advantages of my invention will become apparent as the following description proceeds, and the features of novelty which characterize my invention will be pointed out with particularity in the claims annexed to and forming part of this specification.

For a better understanding of my invention, reference may be had to the accompanying drawings, in the several views of which like parts bear similar reference numerals:

FIG. 1 is a perspective view of a riding support unit and ski assembly embodying features of my invention;

FIG. 2 is a side elevation of the embodiment shown in FIG. 1 with a rider positioned thereon;

FIG. 3 is a perspective view of a riding support unit and ski assembly of child-size dimensions with side runners embodying features of my invention;

FIG. 4 is a sectional view taken along line 4—4 of FIG. 3 showing the attachment of the side runners;

FIG. 5 is a perspective view of a riding support unit and ski assembly using dual skis and an auxiliary seat and foot support embodying features of my invention;

FIG. 6 is a side elevation view of the embodiment shown in FIG. 5;

FIG. 7 is a side elevation view of a riding support unit and wheeled platform assembly embodying features of my invention;

FIG. 8 is a sectional view of the embodiment shown in FIG. 7 taken along line 7—7;

FIG. 9 is a perspective view of a riding support and water ski assembly embodying features of my invention;

FIG. 10 is a sectional view of the embodiment shown in FIG. 9 taken along line 10—10.

Referring now to FIGS. 1 and 2 of the drawing, a riding support unit is shown attached to a conventional snow ski designated by numeral 2. The riding support unit includes an integral hoop-like or endless frame member 3 preferably formed of a single strip of metal tubing such as aluminum or the like. The frame member is shaped to include a generally flat base portion 3a and forward and rear arcuate portions 3b and 3c extending upwardly from the base portion and terminating in a top portion (not shown). The bottom surface of the base portion 3a is flat and seats on the top of the ski at preselected positions in a rigid connection described more fully hereinafter.

A seat 4 rests on and is supported from the top portion of the frame member. Attachment may be by various means such as bolting, welding or the like. The seat 4 is positioned so as to slope rearwardly with respect to the ski with the seat higher at the front and lower at the rear. Portions of the seat extend forwardly and rearwardly of the seating surface of the base portion. The preferred ratio of the horizontal distance from the midpoint of the base portion to the front end and rear end of the seat is about 1 to 1.25.

A pair of handle bars 7 and 8 is attached to the forward portion of the seat 4 for gripping by the rider and each bar extends outwardly and rearwardly an equal distance from each side of the seat. This type of gripping means is preferred for the snow ski because the upper portion of the rider's body is supported thereby as the body weight is shifted forwardly, rearwardly or from side to side in maneuvering the assembly. These bars 7 and 8 are formed from a single bar attached at its intermediate portion to the seat 4.

A pair of foot rests 11 and 12 extends on each side of the vertical plane of the frame member 3. These foot rests are preferably formed of a two-piece assembly which slidably attaches to the forward arcuate portion 3b of the frame member and may be locked or secured at selected heights to accommodate riders of various leg lengths. The forward part of the foot rest assembly has a curved intermediate portion adjoining a portion of the frame member with flat elongated portions extending outwardly therefrom. The rearward part of the foot rest assembly is flat and bolts to the forward part opposite of the arcuate portion to pull the foot rest assembly to a solid locking arrangement on the frame member. At all foot rest positions the foot rests 11 and 12 are forwardly and above the seating surface of the base portion 3a.

A pair of hold-down members 14 and 15 is provided on each side of the frame member for use in holding the body of the rider to the seat if desired. Each hold-down member includes a flexible strap attached at its upper end to the side of forward portion 3b and a ring which extends through a loop in the lower end of the strap. In use, the rings are pulled up and over the legs and held together by hand or by tying.

The riding support unit above described is positioned on the top surface of the ski 2 with the flat bottom surface of the base portion 3a seated on a portion of the upper surface of the ski 2. Fastening members 18 and 19 spaced an equal distance from the center of the base portion 3a extend vertically through suitable apertures in the base portion 3a and ski 2 to rigidly and removably connect the support unit to the ski. Fastening members 18 and 19 are preferably a nut and bolt assembly with the head of the bolt countersunk in the ski above the bottom surface of the ski.

The support unit is positioned on the ski rearwardly of its center and more specifically the ratio of the distance from the rear end of the ski to the rear seating connection at 19 designated A and the distance between the rear and forward ends of the ski designated B ranging between 2.5 to 10 and 4 to 10, depending on the length of the ski. For the seven foot snow ski, the preferred ratio of A to B is about 31 to 84 and the three foot ski about 9 to 36. These ranges of dimensions have been found most suitable for optimum balance of the rider in a sitting position. The length of base portion 3a may vary but a 6-inch length of seating surface has been found most suitable.

Referring now to FIG. 2, the body of a rider 20 is shown in broken lines in a sitting position on the support unit previously described above ski 2. The feet are positioned on the foot rests 11 and 12 forwardly and above the base portion 3a and the hands grasp the handle bars 7 and 8 approximately directly above the base portion 3a. The haunches or lower posterior extremity of the trunk rests on seat 4 rearwardly of the base portion 3a. The rider leans forwardly on handle bars 7 and 8 to and from side to side to maneuver the ski in a manner somewhat analogous to riding a bicycle except that turning movements are induced by shifting weight and no turning mechanism is utilized in this assembly.

In FIGS. 3 and 4 there is shown a child-size assembly with the support unit of smaller dimension but structurally the same as described above with reference to FIGS. 1 and 2. In this size range, the ski 22 will preferably be the three foot length. Side runner skis 23 and 24 are supported in spaced relation an equal distance from each side of ski 22 by a brace 25 extending transversely of the skis. Brace 25 rests on the base portion 3a and the top of ski runners 23 and 24 and fastens to the frame member 3 and ski 2 by a suitable fastener 26 and to the ski runners 23 and 24 by suitable fasteners 27 and 28. The bottom surface of the ski runners is positioned at about the same level as the bottom surface of ski 22. This arrangement maintains the assembly in an upright position for smaller children who do not have the ability to balance themselves on the ski.

Referring now to FIGS. 5 and 6 an alternative embodiment is shown wherein a pair of skis 2 and 2x are used. The support unit includes a pair of hoop-like frame members 3 and 3x rigidly connected to skis 2 and 2x respectively. A seat 4 is supported from the top portion of frame members 3 and 3x with handle bars 7 and 8 and foot rests 11 and 12 secured as above described with respect to FIGS. 1 and 2.

A pair of straps 31 and 32 connect between the respective skis 2 and 2x and frame members 3 and 3x to join them in a fixed spaced relationship. As an alternative a single hoop-like frame member 3 may be used with suitable fastening to the spaced skis 2 and 2x.

An auxiliary seat 34 is detachably connected to the rear end of seat 4 as by bolting 35 at the adjoining ends. Braces 36 and 36x releasably clamp on the rear portion of the frame members in a manner similar to the foot rests previously described and rigidly attached to the seat 4 and the opposite end. In this manner the auxiliary seat 34 may be easily removed and replaced from the assembly. This auxiliary seat is used to support a second rider on the ski behind the first. Foot supports 37 and 37x are attached to skis 2 and 2x respectively, rearwardly of the base portion connection receiving the feet of the second rider. The auxiliary seat 34 with attaching structure may be used on a single ski arrangement as shown in FIGS. 1 and 2 without the foot supports 37 and 37x.

In FIGS. 7 and 8 there is shown the support unit attached to a wheeled platform for illustration of another type of transport member which may be used with the support unit embodying my invention. This transport member comprises a platform having a generally rectangular intermediate portion 41 on which base portion 3a seats in a manner similar to the ski previously described and is rigidly connected thereto by fasteners 18 and 19. Horizontally extending leg portions 42 extend outwardly at equal angles and an equal distance from each corner of the intermediate portion 41. A caster 43 or the like is fitted into the end of each leg portion to support the platform horizontally as a mobile transport assembly.

Referring now to FIGS. 9 and 10 there is shown another riding support unit mounted on a water ski 52. Frame member 3 is rigidly attached to the ski and a seat 4 is supported from the frame member as previously described. A flexible cord 53 is secured at both ends to the front of the seat 4 for gripping by the rider. An eyelet 54 is attached to the front of the seat and an eyelet 55 is attached to the front portion of the frame member for securing of the towing rope.

A pair of side runner skis 57 and 58 are supported in equally spaced relation along each side of water ski 52 by forward and rear braces 61 and 62. Braces 61 and 62 extend transversely of the ski and are attached to a portion of its upper surface by suitable fasteners 63. Both braces are similarly shaped and extend upwardly and outwardly adjoining each end to position the side runner skis slightly above the water ski. Fasteners 59 extend through the end portions of the braces and side runner skis for rigid attachment.

Foot supports 66 and 67 are provided on each of the side runner skis which are positioned outside the vertical plane of the frame member. The side runners for the water ski as shown may be secured in various ways as for example a single cross brace extending transversely of the base portion of the frame member as shown in FIG. 3 may also be used in some assemblies.

With the arrangement above described, the weight of the rider is so distributed that skillful balancing is not required and is particularly easy to operate if the rider has had experience in riding a bicycle. Apparatus embodying this invention may be safely used by beginners and if balance is lost during movement, either foot may be used to maintain balance. It provides rapid transport over various surfaces such as snow, water, concrete or the like and is safe and easy to use.

The versatility of the support unit is apparent in that the user may have the same set of snow skis and water skis fixed to join the support unit so that during the winter season the unit may be mounted on the snow skis and then demounted and attached to water skis during the summer season. In case of children the unit may be mounted on various types of wheeled platforms for sidewalk or driveway usage.

While certain preferred embodiments of the invention have been set forth and described, it is to be understood that certain modifications could be made by a person skilled in the art without departing from the spirit and scope thereof.

I claim:

1. A riding support unit for use in combination with a surface contact transport member, comprising an integral frame member including a base portion formed for rigid seating connection to a transport member, spaced forward and rear upright portions extending upwardly from opposite ends of said base portion, a seat supported from a top surface of said upright portions and having portions forwardly and rearwardly of the seating surface of the base portion, grip means attached to the forward end of said seat, and a foot rest attached to the forward upright support portion forwardly and above the seating surface of the base portion to support a body of a rider in a balanced sitting position above the transport member.

2. A riding support unit for use in combination with a surface contact transport member, comprising a hoop-like integral frame member including a substantially flat base portion formed for rigid seating connection to a transport member, and arcuate forward and rear upright portions in spaced relation extending upwardly from said base portion, a fastening member for rigidly connecting the frame member to the transport member at forward and rear positions, a seat supported from a top surface of said frame member and having portions forwardly and rearwardly of the seating surfaces of the base portion, grip means attached to the forward end of said seat, and a foot rest attached to said forward upright portion forwardly and above the seating surface of the base portion to support a body of a rider in a balanced sitting position above the transport member.

3. A riding support unit for use in combination with a surface contact transport member, comprising an endless frame member including a base portion formed for fixed seating connection to a transport member and spaced forward and rearward upright portions extending upwardly from opposite ends of said base portion, a seat supported at the top of the endless member and having portions forwardly and rearwardly of the seating surface of the base portion, grip means mounted at the forward end of said seat with portions extending rearwardly at each side of said seat at a higher elevation than the seat, and a foot rest supported by the forward upright frame portion intermediate the seat and the transport member for support of a body of a rider in a balanced sitting position over the transport member.

4. A riding support unit as defined in claim 3, in which the foot rest is secured at selective elevations on said forward upright portion.

5. A riding support unit as defined in claim 3, in which said grip means are upwardly ranging handle bars.

6. A riding support unit as defined in claim 3, in which said grip means are laterally ranging handle bars.

7. A riding support unit as defined in claim 3, in which the distance from the forward end of the transport member to the seating connection of the base portions of the frame member is greater than the distance from said connection to the rear end of said transport member.

8. A riding support unit as defined in claim 3, in which the transport member is a snow ski.

9. A riding support unit as defined in claim 3, in which the transport member is a water ski.

10. A riding support unit as defined in claim 3, in which the frame member is formed from a single piece of material.

11. A riding support unit as defined in claim 3, in which the frame member is of generally oval shape.

References Cited

UNITED STATES PATENTS

| | | | |
|---|---|---|---|
| 1,672,782 | 6/1928 | Ring | 280—12 |
| 1,954,830 | 10/1931 | Richards | 280—12 |
| 2,506,462 | 5/1950 | Loucks | 280—12 |

BENJAMIN HERSH, *Primary Examiner.*

L. D. MORRIS, *Assistant Examiner.*